Feb. 15, 1966
G. MATSUYAMA
3,235,336
METHOD AND APPARATUS FOR DETERMINING IODINE IN ORGANIC
AND BIOLOGICAL MATERIALS
Filed June 20, 1963
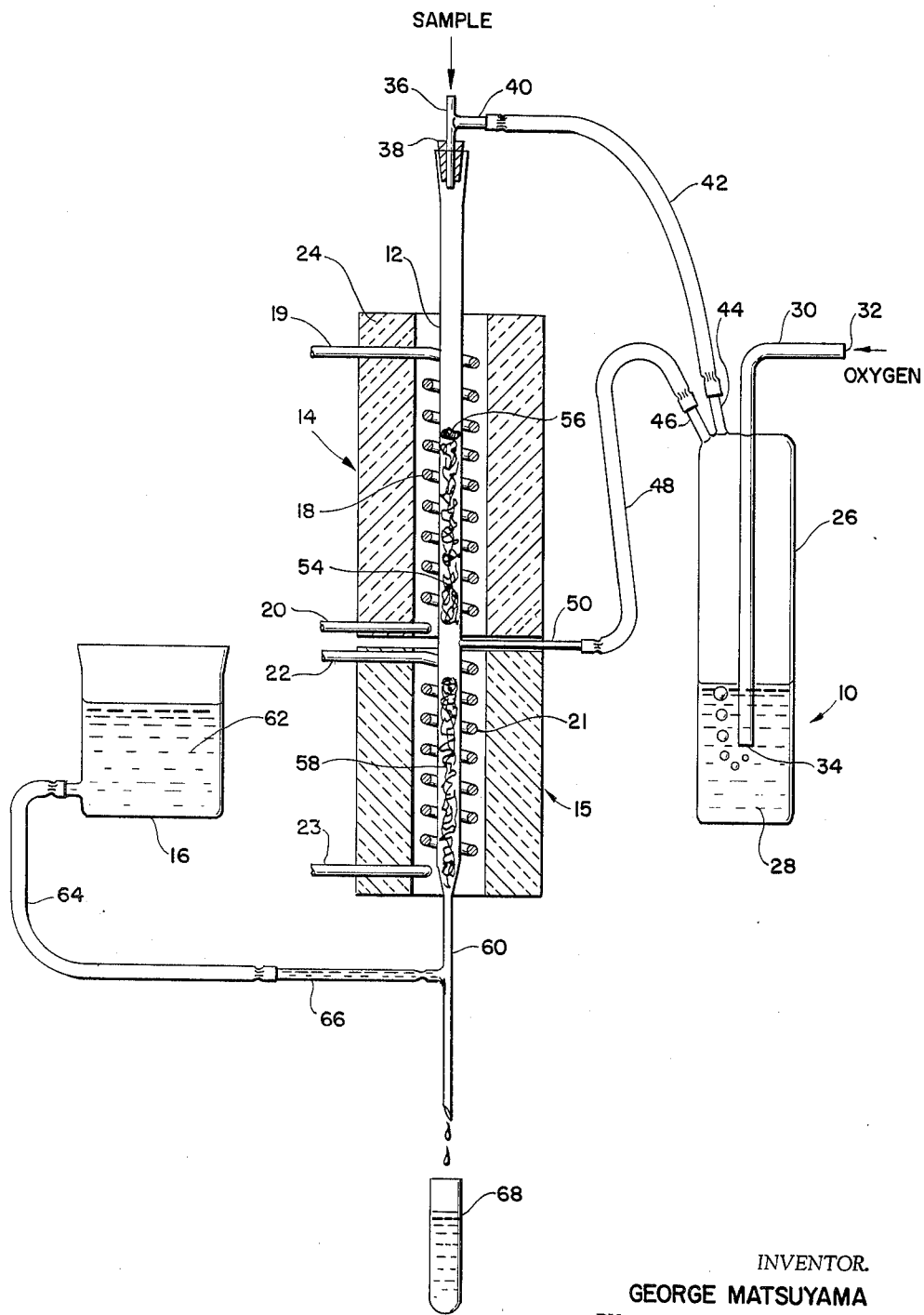
INVENTOR.
GEORGE MATSUYAMA
BY
Thomas L. Peterson
ATTORNEY

United States Patent Office 3,235,336
Patented Feb. 15, 1966

3,235,336
METHOD AND APPARATUS FOR DETERMINING IODINE IN ORGANIC AND BIOLOGICAL MATERIALS
George Matsuyama, Fullerton, Calif., assignor to Beckman Instruments, Inc., a corporation of California
Filed June 20, 1963, Ser. No. 289,179
27 Claims. (Cl. 23—230)

This invention relates to a method and apparatus for separating organic and inorganic iodine from organic and biological samples and, in particular, to a method and apparatus for determining the iodine content of such samples.

The determination of organic and inorganic iodine in organic and biological materials is of very great importance, particularly in the medical-clinical field where protein-bound iodine (PBI) in blood is used as an indication of the functional condition of the thyroid gland. Various methods have been developed from the measurement of organic and inorganic iodine, but they have been characterized by requiring a number of time consuming and complicated steps which may result in a considerable source of error in the final determination, require intricate and expensive equipment and skilled technicians.

In the conventional method used in laboratories and clinics today for determining the inorganic and organic iodine content of a simple, such as blood, about a 1 milliliter sample is provided to which there is added zinc sulfate and sodium hydroxide to coagulate the protein out of the blood sample. Next the sample is centrifuged and the supernatant liquid, which contains inorganic iodine, is poured off from the precipitate. The precipitate contains the organic iodine, or protein-bound iodine, the amount of which is desired to be determined. Thereafter the precipitate is washed and potassium carbonate is added to provide a coating for the protein. Next the protein covered with potassium carbonate is placed in an oven to burn off the organic matter, leaving primarily potassium iodate ash. The above steps require some three to four hours time to perform. Thereafter, a mixture of sulfuric and hydrochloric acid is added to the ash to dissolve the iodine. Then an arsenite solution and ceric sulfate solution are added to the solution. If iodine is present in the sample, it catalyzes the reaction of the arsenite and ceric. Reduction of the yellow ceric color by the reaction is indicative of the amount of iodine in the solution and, thus, the PBI content of the sample. This amount may be determined by any optical density measuring device, such as a colorimeter or spectrophotometer.

The conventional method of determining the inorganic iodine content of a blood sample is performed by taking the supernatant, which results from the initial centrifuging step mentioned above, and evaporating it and then dissolving it in a sulfuric and hydrochloric acid mixture. Thereafter, the arsenite and ceric solutions are added as stated above so that the inorganic iodine content of the original sample may be determined colorimetrically. The entire process for determining organic and inorganic iodine in blood takes some four to six hours to perform.

It is therefore the principal object of the present invention to provide a method and apparatus for rapidly separating organic and inorganic iodine from organic and biological samples, such as blood serum or the like.

Another object of the invention is to provide a method and apparatus for rapidly and inexpensively determining the total iodine content of organic or biological samples, such as blood serum.

Still a further object of the invention is to provide a method and apparatus for rapidly determining both the organic and inorganic iodine content of organic and biological samples.

According to the principal aspect of the present invention, an organic or biological sample containing inorganic iodine and organic iodine is treated with an acid and heated in the presence of oxygen to burn the organic matter in the sample. By this method, the total iodine in the sample is quantitatively volatilized and separated from the sample within several minutes.

According to another aspect of the invention, the volatile compound of iodine separated from the sample in the manner started above is recovered quantitatively by being absorbed in a scrubbing solution. Then the iodine content of the solution, that is, the total iodine in the sample, may be determined by the colorimetric method described above, by titration methods, by electrometric methods or other methods suitable for the determination of iodine. Still an additional aspect of the invention involves providing an initial treatment of the sample to separate either the inorganic iodine or PBI from the sample and, thereafter, treating the resulting sample in accordance with the principal aspect of this invention so that both the organic and inorganic iodine content of the original sample can be determined.

Other objects, aspects and advantages will become apparent from the following description taken in connection with the accompanying drawing which diagrammatically illustrates an apparatus which may be used to perform the method of this invention.

In order to appreciate the novel aspects of this invention, consideration is first given to the classical method for measuring halogens in organic compounds. Conventionally, the halogen content of an organic compound containing elements such as carbon, hydrogen, oxygen, nitrogen, and the halogens is performed by placing the sample in a furnace and passing a stream of oxygen through the furnace to burn the sample thus causing the halogen in the organic sample to separate therefrom and pass out the other end of the furnace. The halogen is then absorbed in a sodium hydroxide solution and the halogen content is determined by titration or colorimetric methods. This method is suitable for determining halogens in organic samples in which there are no ash-forming materials, such as metallic elements or salt forming materials (or example, sodium, calcium and magnesium salts, phosphorus and inorganic iodine). Blood samples which contain inorganic substances are incapable of having the iodine content separated from the sample in the conventional furnace because the iodine in such samples is involatile and will not separate and pass out the other end of the furnace. Thus, the iodine content of blood has never been able to be determined by using this conventional method of determining halogens.

It has been discovered, however, that if the sample is treated with an acid and then burnt in the presence of oxygen, the total iodine in the sample separates therefrom in the form of a volatile compound of iodine. Preferably, the sample is burnt in a combustion furnace with a stream of oxygen passing therethrough. The volatilized iodine may be recovered quantitatively from the furnace by being absorbed in a scrubbing solution. The iodine content of the solution, which is indicative of the total iodine content of the original sample, may be determined by colorimetry, spectrophometry, electrochemical methods or any conventional titration method. Thus, in contrast to the conventional methods for determining halogens, the present invention provides a means for determining the iodine content of an organic or biological sample which contains ash-forming materials.

The preferred procedure for supplying acid to the sample is to add the acid to the oxygen stream used in the combustion of the sample. It has been found that this can be accomplished by passing the stream of oxygen through a bubbler containing 24% hydrochloric acid before it passes through the combustion furnace over the sample. However, it is also possible to initially treat the sample with an acid, such as hydrochloric or sulfuric acid, by adding the acid directly to the sample and inserting the mixture into the combustion furnace by means of a glass spoon or the like.

The volatile compounds of iodine formed in the combustion furnace by burning the sample are believed to include HI, $I_2$ and ICl. These compounds pass through the furnace and are absorbed in a scrubbing solution, such as an acid sodium arsenite solution. Thus, by the above method, the total organic iodine (PBI) and inorganic iodine in a blood sample or the like is separated from the sample and absorbed in a solution which may be analyzed for the total iodine content of the sample. As can be seen, the above method is extremely simple, inexpensive and the separation of iodine from the sample requires only about two minutes in contrast to the conventional method of blood analysis which requires some three to four hours to separate the iodine from the sample. Also, subsequent samples may be injected into the apparatus of this invention at approximately two-minute intervals to determine their iodine content with most favorable results. As mentioned above, the iodine content in the scrubbing solution may be determined by any conventional means, such as colorimetrically using the catalysis of the ceric-arsenite reaction, potentiometrically using the silver-silver iodide electrode, colorimetrically using the oxidation of iodide to iodate or silver to silver iodide, or titrimetrically using the precipitation of silver iodide.

A preferred apparatus for performing the method of this invention is illustrated in the drawing and comprises basically a bubbler 10, a combustion tube 12 surrounded by two furnaces 14 and 15 and a container 16 filled with scrubbing solution. The furnaces 14 and 15 may be of any conventional type and, as shown in the drawing, furnace 14 includes a resistance coil 18 having leads 19 and 20 while furnace 15 includes a resistance coil 21 and leads 22 and 23 passing through an insulating jacket 24. The purpose of the two furnaces will be discussed later. The leads are adapted to be connected to a power source, not shown, for heating the combustion tube 12. The combustion tube may be formed of quartz tubing and is disposed in the central portion of the furnace 14.

The bubbler 10 is of conventional construction and comprises a glass container 26 holding a supply of hydrochloric acid 28. A bent tube 30 passes through the upper end of the container 26 and has its outer end 32 connected to an oxygen supply, not shown. The inner end 34 of the tube 30 is submerged in the acid 28 so that oxygen passing through tube 30 will bubble through the acid, vaporizing the acid and thus providing a mixture of vaporized acid and oxygen in the upper portion of the container 26.

A sample injection tube 36 is mounted in the upper or inlet end of the combustion tube 12 by a stopper 38. The injection tube 36 has a stem 40 which is connected by a tube 42 to an outlet port 44 on the bubbler 10. The bubbler is provided with a second outlet 46 which is connected by a tube 48 to a glass duct 50 which is positioned between the furnaces 14 and 15 and opens into the combustion tube 12 intermediate the ends thereof. The combustion tube 12 is packed with inert, porous material, such as quartz wool or chips 54 and 58, to retain sample 56 which is inserted through the injection tube 36 by any suitable means, such as a syringe or the like. The inert packing also serves to mix the gases in the tube, and to act as a heat exchange medium for heating the flowing gas to the tube temperature.

As can be seen, oxygen passing into the bubbler 10 will develop a mixture of acid and oxygen vapor which will pass through the tubes 42 and 48 into the upper end of the combustion tube 12 and through tube 50 to the lower portion of the combustion tube. Thus, when the furnaces 14 and 15 are heated to the temperature for combustion of the sample, the gas passing through tube 42 into the upper end of the combustion tube 12 will cause the vaporized portion of the sample to pass through the quartz packing 54 toward the outlet end 60 of the combustion tube. The gas passing through the tube 50 to the lower portion of the combustion tube 12 ensures that there is a complete burning of all the sample including portions thereof which might pass downstream without being completely burnt, thus making certain that all of the iodine is separated from the sample. The ash of the sample remains on the upper portion of the quartz packing 54.

The combustion tube may be heated in several ways. Generally, both the furnaces 14 and 15 and thus the entire combustion tube 12 will be heated to the combustion temperature of the sample before the sample is inserted into the combustion tube. If the combustion tube is not heated to that temperaure, but is at a lower temperature or at room temperature before insertion of the sample therein, part of the sample might volatilize or decompose and pass through the tube without complete burning of the sample. In some situations it is preferable to keep the upper portion of tube 12 cool, that is, that portion above the intersection of tube 50 with the combustion tube, while maintaining the lower portion of the tube at the combustion temperature of the sample. Such situations are those in which the sample might instantaneously volatilize upon insertion into the combustion tube and quickly pass through the tube without being completely burnt and therefore not permitting complete separation of iodine from the sample. Once the sample under the above situation is inserted into the cool portion of the combustion tube, furnace 14 is brought up to the combustion temperature of the sample to assist in the complete burning of the sample. In other cases, it is preferable to have the temperature of the upper portion of combustion tube high enough to volatilize the sample but not so high as to burn the sample when it is first inserted into the tube. As in the prior case, after insertion of the sample into the combustion tube, it is preferable that furnace 14 be brought up to the combustion temperautre of the sample.

Under all circumstances the lower portion of the combustion tube is heated to the combustion temperature of the sample before insertion of sample into the tube so that decomposed but unburnt portions of a sample will be completely burnt before passing through the outlet end of the combustion tube. As stated above, the supply of gas from the bubbler 26 through tube 50 ensures a complete burning of the sample in the lower portion of the combustion tube besides supplying acid to the sample which, together with the heating of the sample to its combustion temperature, permits a volatile compound of iodine to separate from the sample.

The container 16 containing a scrubbing solution 62, such as arsenite or sodium hydroxide solution, is connected by a plastic tube 64 to a quartz stem 66 which extends from the outlet end 60 of the combustion tube. Thus, when the volatile compound of iodine passes through the outlet end of the combustion tube 12 it will be absorbed into the scrubbing solution 62 passing through the stem 66 and the resulting solution drops into a receptacle 68. The solution in receptacle 68 may then be analyzed to determine the iodine content thereof by the conventional methods mentioned above.

The temperature of the combustion tube 12 has been found not to be critical. It is merely necessary that the sample be heated to a sufficient temperature that it will be completely burnt and all the iodine will be separated therefrom. The furnaces 14 and 15 have been operated between 500° C. and 900° C. with no appreciable effect on the determination of iodine in the sample. However, it is obvious that the furnaces could be operated at higher temperatures if desired and also at lower temperatures if a catalyst is added to ensure complete burning of the sample at such lower temperatures. Also, the amount of acid does not seem to be critical so long as enough is present to keep the combustion tube 12 and gas stream acidic. The 24% hydrochloric acid solution has been maintained at temperatures from 20° to 80° C., and suitable results have been obtained. Over this temperature range there is as much as a 50-fold change in amount of acid in the gas stream but no differences in results were detected.

Although the combustion furnaces and combustion tube have been illustrated as being disposed vertically in the arrangement shown in the drawing, the method of the invention may also be performed by disposing the combustion tube horizontally and inserting the sample into the tube with a quartz spoon or the like. This method is preferable when adding acid, such as hydrochloric or sulfuric acid, directly to the sample and inserting the mixture into the combustion tube. Also, two rather than one bubbler may be provided to supply a mixture of acid and oxygen to the upper and lower portions of the combustion tube 12.

The above method and apparatus provides a means for determining the total iodine content of an organic or biological sample, that is, the total amount of organic and inorganic iodine in the sample. However, on occasion it is desirable to determine only the protein-bound iodine content of a sample or the inorganic iodine content thereof. To determine the inorganic iodine content of a sample, the protein may be removed from the sample by adding a 10% trichloroacetic acid solution, methanol or acetone to precipitate out the protein. After precipitating the protein from the sample, the remaining fluid containing inorganic iodine is inserted through the injection tube 36 of the apparatus shown in the drawing and is treated in the same manner as discussed above with the result that a volatile iodine compound passing through the outlet end 60 of the combustion tube will be determinative of the inorganic iodine content of the sample.

To determine only the protein-bound or organic iodine content of a sample, a novel method may be used to separate the inorganic iodine from the sample before inserting it into the combustion tube. This method is disclosed in detail in copending patent application Serial No. 289,425, filed concurrently herewith, by John E. Leonard, entitled "Method of Removing Inorganic Iodine From Blood," assigned to the same assignee as the present invention. As disclosed in said application, the inorganic iodine in the blood sample may be removed therefrom by adding a small amount of solid silver chloride to the sample. It has been discovered that the PBI can be separated from the inorganic iodine by merely shaking the sample with the silver chloride and allowing the solid containing inorganic iodine to settle out. Then, the supernatant sample containing the PBI is injected into the combustion furnace 12 of the present invention. Inorganic iodine may also be removed by shaking the sample with strong base anion exchange resin in the chloride form.

It has been found that the direct determination of inorganic iodine by removal from the sample in the manner described above does not provide quite as accurate results as the determination of total iodine or PBI. Thus, it would be preferable to determine the amount of PBI in a blood sample in accordance with the novel method described above, and the total amount of iodine in this sample as first discussed above, and then subtract the amount of PBI from the total to obtain the amount of inorganic iodine in the sample.

It has been found that the results obtained with the method and apparatus of this invention for determination of PBI alone and for total iodine are within .5 microgram percent of values obtained by the conventional method practiced in the clinics and laboratories today. Moreover, it has been found that the reproducibility of the results utilizing the present invention is more than two times superior to the reproducibility of results obtained by the conventional method. Thus, there is provided by the present invention an extremely fast, inexpensive and accurate method of determining total iodine, PBI and inorganic iodine in blood samples and in other organic and biological samples containing inorganic iodine or other ash-forming materials.

Although several embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:

1. In a method for separating organic and inorganic iodine from organic and biological samples, the steps of:
   providing a sample containing organic and inorganic iodine;
   supplying acid to said sample; and
   burning said sample while supplied with acid and in an oxygen containing atmosphere to separate said iodine therefrom.

2. In a method for separating organic and inorganic iodine from a blood sample, the steps of:
   providing a sample of blood;
   supplying acid to said sample; and
   burning said sample while supplied with acid and in an oxygen containing atmosphere to separate the iodine therefrom.

3. In a method for separating organic and inorganic iodine from organic and biological samples, the steps of:
   providing a sample containing organic and inorganic iodine;
   supplying acid to said sample;
   passing a stream of oxygen over said sample; and
   burning said sample while supplied with acid in the presence of said stream of oxygen to separate said iodine from the sample, 4. In a method for separating organic and inorganic iodine from organic and biological samples, the steps of:
   providing a sample containing organic and inorganic iodine;
   passing a mixture of acid and oxygen over said sample; and
   burning said sample in the presence of said mixture of acid and oxygen to separate said iodine from the sample.

5. In a method for separating organic and inorganic iodine from organic and biological samples, the steps of:
   providing a sample containing organic and inorganic iodine;
   providing a tube having an inlet end and an outlet end;
   heating at least a portion of said tube adjacent said outlet end to the combustion temperature of the sample;
   placing said sample in said tube; and
   supplying a stream of a mixture of acid and oxygen to said inlet end of said tube while maintaining at least said portion of the tube at the combustion temperature of said sample to burn the sample and thereby separate the iodine from said sample whereby said iodine will pass out the outlet end of said tube.

6. In a method for separating organic and inorganic iodine from organic and biological samples, the steps of:
   providing a sample containing organic and inorganic iodine;
   providing a tube having an outlet end;

heating at least a portion of said tube adjacent said outlet end to the combustion temperature of the sample;

providing a bubbler containing an acid;

passing oxygen through said bubbler to provide a mixture of acid and oxygen;

placing said sample in said tube; and passing said mixture of acid and oxygen through said tube while maintaining at least said portion of the tube at the combustion temperature of said sample to burn the sample and thereby separate said iodine from the sample.

7. A method as set forth in claim 6 wherein the acid in said bubbler is HCl.

8. In a method for separating organic and inorganic iodine from organic and biological samples, the steps of:

providing a sample containing organic and inorganic iodine;

providing a tube having an outlet end;

heating only a portion of said tube adjacent said outlet end to the combustion temperature of the sample;

placing said sample in said tube; and passing a mixture of acid and oxygen through said tube while maintaining at least said portion of the tube at the combustion temperature of said sample to burn the sample and thereby separate the iodine from the sample.

9. The method as set forth in claim 8 including the additional step of heating the remainder of said tube to the combustion temperature of said sample after said sample is placed in said tube and while said mixture of acid and oxygen passes through said tube.

10. In a method for separating organic and inorganic iodine from organic and biological samples, the steps of:

providing a sample containing organic and inorganic iodine;

providing a tube having an inlet end and an outlet end;

heating one portion of said tube adjacent said inlet end to a temperature to volatilize said sample;

heating the other portion of said tube adjacent said outlet end to the combustion temperature of said sample;

placing said sample in said tube; and passing a mixture of acid and oxygen through said tube while heating said portions of said tube to burn the sample and thereby separate the iodine from the sample.

11. In a method for separating organic and inorganic iodine from organic and biological samples, the steps of:

providing a sample containing organic and inorganic iodine;

supplying sulfuric acid to said sample;

providing a tube having an outlet end;

heating at least a portion of said tube adjacent said outlet end to the combustion temperature of the sample;

placing said mixture of sample and acid in said tube; and passing a stream of oxygen through said tube while maintaining at least said portion of the tube at the combustion temperature of said sample to burn the sample and thereby separate said iodine from the sample.

12. In a method for separating protein-bound iodine and inorganic iodine from a blood sample, the steps of:

providing a blood sample;

providing a tube having an outlet end;

heating at least a portion of said tube adjacent said outlet end to the combustion temperature of the blood sample;

placing said blood sample in said tube; and passing a mixture of acid and oxygen through said tube while maintaining at least said portion of the tube at the combustion temperature of said sample to burn the sample and thereby separate the protein-bound iodine and inorganic iodine from the blood sample.

13. In a method for separating protein-bound iodine and inorganic iodine from a blood sample, the steps of:

providing a blood sample;

supplying acid to said sample;

passing a stream of oxygen over said sample; and heating said sample while supplied with acid to the combustion temperature of said sample in the presence of said stream of oxygen to separate the protein-bound iodine and inorganic iodine from the sample.

14. A method as set forth in claim 13 wherein said acid is chosen from the group consisting of HCl and $H_2SO_4$.

15. In a method for determining the organic and inorganic iodine content of organic and biological samples, the steps of:

providing a sample containing organic and inorganic iodine;

supplying acid to said sample;

passing a stream of oxygen over said sample;

heating said sample while supplied with acid to the combustion temperature of said sample in the presence of said stream of oxygen to separate said iodine from the sample;

dissolving said iodine in a scrubbing solution; and determining the iodine content of the solution.

16. In a method for determining the organic and inorganic iodine content of organic and biological samples, the steps of:

providing a sample containing organic and inorganic iodine;

passing a mixture of acid and oxygen over said sample;

heating said sample to its combustion temperature in the presence of said mixture of acid and oxygen to separate said iodine from the sample;

dissolving said iodine in a scrubbing solution; and determining the iodine content of the solution.

17. A method for determining the protein-blood iodine and inorganic iodine of a blood sample, the steps of:

providing a sample of blood;

providing a tube;

heating said tube to the combustion temperature of said sample;

placing said sample in said tube;

providing a bubbler containing HCl;

passing oxygen through said bubbler to produce a mixture of acid and oxygen;

passing said mixture of acid and oxygen through said tube while maintaining said tube at the combustion temperature of said sample to burn the sample and thereby separate said iodine from the sample;

dissolving said iodine in a scrubbing solution of sodium arsenite; and determining the iodine content of said solution.

18. In a method for determining the protein-bound iodine content of a blood sample, the steps of:

providing a sample of blood;

removing inorganic iodine from said sample;

supplying acid to the remaining sample;

passing a stream of oxygen over said remaining sample;

heating said remaining sample while supplied with acid to the combustion temperature of said remaining sample in the presence of said stream of oxygen to burn the remaining sample and thereby separate the iodine from the remaining sample;

dissolving said iodine in a scrubbing solution; and determining the iodine content of the solution.

19. In a method for determining the protein-bound iodine content of a blood sample, the steps of:

providing a sample of blood;

adding silver chloride to said sample and allowing the inorganic iodine to precipitate out leaving a supernatant sample containing the protein-bound iodine;

supplying acid to said supernatant sample;

passing a stream of oxygen over said supernatant sample;

heating said supernatant sample while supplied with acid to the combustion temperature of said supernatant sample in the presence of said stream of oxygen to burn said supernatant sample and thereby separate the iodine from the supernatant sample;

dissolving said iodine in a scrubbing solution; and determining the iodine content of the solution.

20. In a method for determining the inorganic iodine content of a blood sample, the steps of:

providing a sample of blood;

adding a protein coagulant to said sample to remove the protein-bound iodine therefrom thereby leaving a supernatant sample;

supplying acid to said supernatant sample;

passing a stream of oxygen over said supernatant sample;

heating said supernatant sample while supplied with acid to the combustion temperature of said supernatant sample in the presence of said stream of oxygen to burn said supernatant sample and thereby separate the iodine from said supernatant sample;

dissolving said iodine in a scrubbing solution; and determining the iodine content of said solution.

21. A method as set forth in claim 20 wherein said protein coagulant is chosen from the group consisting of trichloracetic acid, methanol and acetone.

22. In an apparatus for separating organic and inorganic iodine from organic and biological samples, the combination of:

an elongated tube adapted to hold a sample; one end of said tube providing an inlet for said sample and the other end providing an outlet for iodine separated from said sample;

heating means adjacent to said tube for burning sample in said tube;

bubbler means;

oxygen inlet means in said bubbler means for bubbling oxygen through an acid in said bubbler means;

outlet means in said bubbler means;

duct means connecting said bubbler outlet means to the inlet end of said elongated tube and to a point intermediate the ends of said elongated tube for supplying a mixture of oxygen and acid thereto, thereby ensuring the complete burning of said sample and thus permitting all the iodine in the sample to be separated therefrom.

23. An apparatus as set forth in claim 22 and, in addition:

a scrubbing solution reservoir; and a duct from said reservoir intersecting the outlet end of said tube whereby iodine from said tube separated from the sample will be dissolved in scrubbing solution.

24. In an apparatus for separating organic and inorganic iodine from organic and biological samples, the combination of:

an elongated tube adapted to hold a sample, one end of said tube providing an inlet for said sample and the other end providing an outlet for iodine separated from said sample;

a second tube opening into said first tube intermediate the ends thereof;

heating means adjacent to said first tube for burning sample in said first tube;

bubbler means;

oxygen inlet means in said bubbler means for bubbling oxygen through an acid in said bubbler means;

outlet means in said bubbler means;

duct means connecting said bubbler outlet means to the inlet end of said elongated tube and to said second tube for supplying a mixture of oxygen and acid thereto, thereby ensuring the complete burning of said sample and thus permitting all the iodine in the sample to be separated therefrom.

25. An apparatus as set forth in claim 24 and, in addition:

a body of inert, porous material disposed in said first tube above the opening of said second tube into said first tube for supporting a sample thereon.

26. An apparatus as set forth in claim 24 wherein said heating means includes means for separately heating (1) the portion of said tube between the point where said second tube opens into said first tube and said outlet of the tube and (2) the remainder of said tube.

27. In a method for separating organic and inorganic iodine from a blood sample, the steps of:

providing a sample of blood;

supplying acid to said sample; and heating said sample to about 500° C. or greater while supplied with acid and in an oxygen containing atmosphere to burn the sample and thereby separate the iodine therefrom.

References Cited by the Examiner

UNITED STATES PATENTS 1,857,632  5/1932  Girvin _____ 23—216

OTHER REFERENCES

Bauer et al., Bray's Clinical Laboratory Methods. The C. V. Mosly Company, St. Louis, Mo., 1962; 6th edition, pages 279-2R4.

Ellis et al., "Distillation of Micro Quantities of Iodine," Analytical Chemistry, 25 (10), October 1953. Pages 1558-9.

Goodwin et al., "Chloric Acid Method for Determining Protein-Bound Iodine by Use of Iodine-131." Analytical Chemistry, 29 (11) November 1957. Pages 1681-84.

Moran, J., "Factors Affecting the Determination of Protein-Bound Iodine in Serum." Analytical Chemistry, 24 (2), February 1952. Pages 378-384.

Sobel et al., "Modified Procedure for Determination of Protein-Bound Iodine in Serum." Analytical Chemistry, 24 (11), November 1952. Pages 1829-1831.

Studier et al., "A Generalized Procedure for the Isolation of Iodine Without Carrier—Its Determination by Neutron Activation Using $I^{29}$ as an Isotopic Tracer." July 1962 (Argonne National Laboratory Report—6577).

MORRIS O. WOLK, *Primary Examiner.*

JAMES H. TAYMAN, JR., *Examiner.*